United States Patent
Hara et al.

(10) Patent No.: US 6,880,802 B2
(45) Date of Patent: Apr. 19, 2005

(54) VALVE DEVICE

(75) Inventors: Tetsuhiko Hara, Nagano (JP); Shigeru Ozawa, Nagano (JP)

(73) Assignee: Sankyo Seiki Mfg. Co., Ltd., Nagano-ken (JP)

(*) Notice: Subject to any disclaimer, the term of this patent is extended or adjusted under 35 U.S.C. 154(b) by 0 days.

(21) Appl. No.: 10/660,882

(22) Filed: Sep. 12, 2003

(65) Prior Publication Data

US 2004/0119040 A1 Jun. 24, 2004

(30) Foreign Application Priority Data

Sep. 12, 2002 (JP) ........................................ 2002-266349
Apr. 1, 2003 (JP) ........................................ 2003-097968

(51) Int. Cl.[7] ................................................ F16K 5/10
(52) U.S. Cl. .................. 251/208; 251/129.11; 251/339; 137/315.17
(58) Field of Search ...................... 251/129.05, 129.11, 251/208, 304, 339, 359–361; 137/15.17, 15.21, 315.09, 315.11, 315.17, 315.38, 614.11

(56) References Cited

U.S. PATENT DOCUMENTS 6,682,045 B1 * 1/2004 Hashimoto ............. 251/129.11
6,769,445 B1 * 8/2004 Hashimoto et al. ..... 137/315.17

FOREIGN PATENT DOCUMENTS

JP         2001116152 A   *  4/2001    ............. F16K/1/14

* cited by examiner

*Primary Examiner*—Tuan Nguyen
(74) *Attorney, Agent, or Firm*—Reed Smith LLP

(57) ABSTRACT

A valve device having a novel vale seat plate is provided. The valve seat plate has an inlet opening, an outlet opening, a front side and a back side. A sealing case covers the front side and inlet and outlet pipes are attached to the back side to communicate respectively with the inlet and outlet openings. A valve element moves to cover the outlet opening on the front side to close the outlet opening. The novel valve seat plate includes at least two plates that are joined to each other. One plate forms the area around the outlet opening and the other plate forms other areas of the valve seat plate.

14 Claims, 6 Drawing Sheets

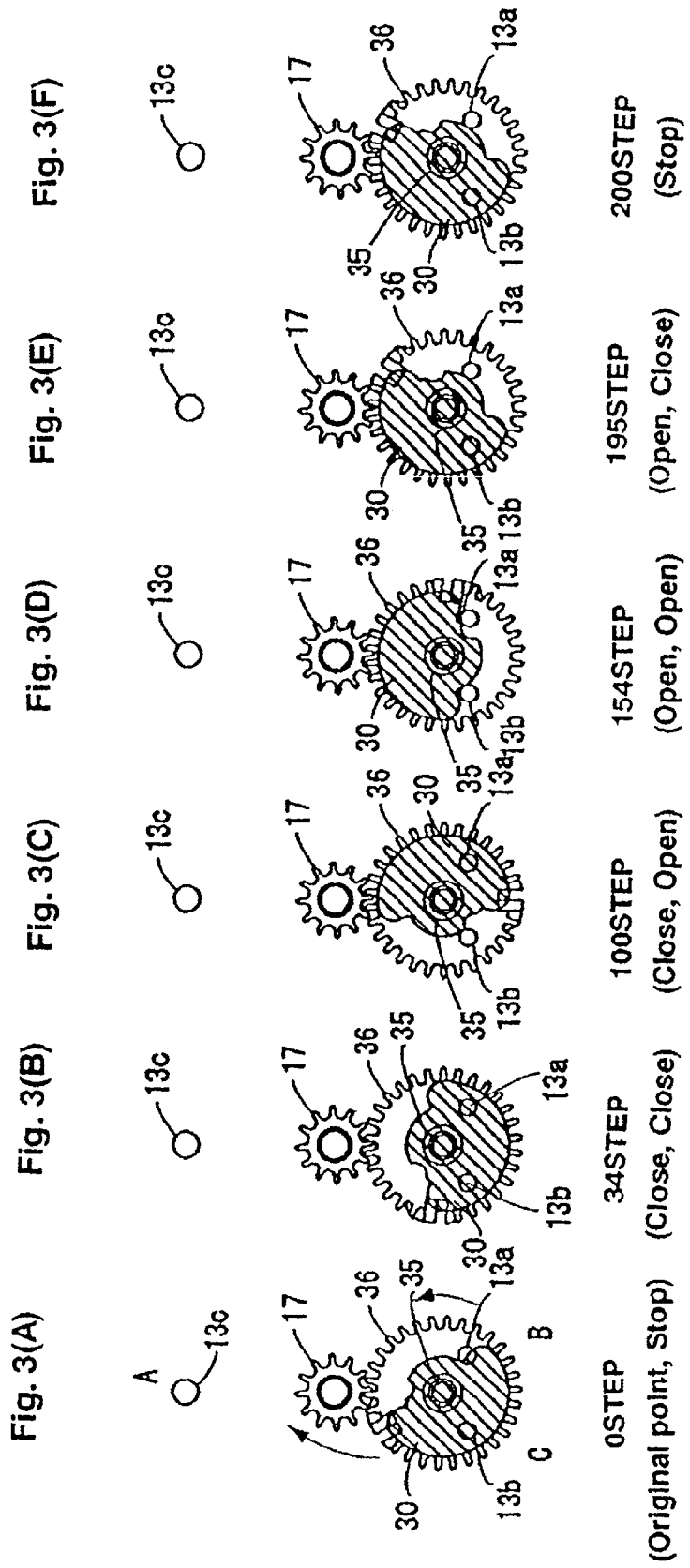

VALVE DEVICE

BACKGROUND OF THE INVENTION

1. Field of Invention

The present invention relates to a valve device. More specifically, it relates to configuration of a valve seat plate which is used in the valve device.

2. Description of Related Art

In refrigerators, a valve device is used to distribute a common refrigerant (fluid) to a plurality of compartments to cool them. As illustrated in FIGS. 6(A) and (B), such a valve device comprises a valve seat plate 13' having a refrigerant inlet opening 13c and refrigerant outlet openings 13a and 13b through which a refrigerant flows in the thickness direction, a sealing case (not illustrated) which covers a front surface of the valve seat plate 13', and a valve element (not illustrated) which rotates on the front surface of the valve seat plate 13' to open and close the refrigerant outlets 13a and 13b. Also, a rotor support shaft 18 and a valve element support shaft 35 are fixed to the valve seat plate 13'.

In the valve seat plate 13', the inlet opening 13c and outlet openings 13a and 13b are formed as holes, each of which has a small diameter portion on the front side and a large diameter portion on the back side. The portions of different diameters are connected by a step. The large diameter portions of the inlet opening 13c and outlet openings 13a and 13b on the back surface side are the holes for inserting pipes. Inlet pipe 28c and outlet pipes 28a and 28b are brazed to the respective pipe-inserting holes with the incoming ends thereof in contact with the steps.

In a valve device having such a configuration, the area of the outlet openings 13a and 13b in the front surface of the valve seat plate 13' is the surface on which the valve element rotates. Therefore, this area of the front surface of the valve seat plate 13' is required to have high surface precision so that the flow of the refrigerant is completely cut off. Also, the valve seat plate 13' needs to have a thickness such that the surface on which the valve element rotates does not warp even when heated to the temperature of 1000° C. or above for fixing the pipes 28a, 28b and 28c by brazing. Further, the valve seat plate 13' needs to be composed of a ferrous material so that it can be brazed, and SUS is used because of its excellent corrosion resistance.

For these reasons, when the valve seat plate 13' is manufactured conventionally, a thick SUS needs to be lathed, which increases the cost of the valve seat plate 13'.

Although forging may be considered in place of lathing, as a manufacturing method for a valve seat plate, it is also an expensive method though not as costly as lathing. In addition, when it is a sintered body, a hole-sealing process is required. Also, it is difficult to obtain precise dimensions and positions of the holes. Also, forging creates a great residual stress on the surface; therefore, when brazed, the surface which requires high precision is warped due to the heat of the brazing.

A sinter molding may also be considered in place of lathing as a manufacturing method for a valve seat plate. However, this method is also expensive though not as costly as lathing. In addition, when a sintered body is used, a hole-sealing process is required. However, resin-impregnation, a common hole-sealing process, is problematic because the resin cannot resist the brazing temperature. Further, since a sintered body is low in surface hardness, its resistance against the rotation of the valve element is also poor. Furthermore, sintering restricts the smallest formable hole diameter. For example, to form a hole with a diameter of 1.5φ by sintering, a lathing process is required as a secondary process.

Considering the above problems, an object of the present invention is to provide a valve device in which pipes can be installed without causing warping on the area of the surface on which a valve element rotates, and which can reduce the manufacturing cost of a valve seat plate.

SUMMARY OF THE INVENTION

To achieve the above object, the present invention comprises a valve seat plate having an inlet opening and an outlet opening through which a fluid flows in the thickness direction, a sealing case which covers a front surface of the valve seat plate, an inlet pipe and an outlet pipe which are fixed on a back surface of the valve seat plate to respectively communicate with the inlet opening and the outlet opening, and a valve element which rotates on the area of the outlet opening in the front surface of the valve seat plate to open and close the outlet opening; wherein the valve seat plate has a first plate member, which forms the area of the outlet opening, and a second plate member, to which the first plate member is joined.

In one embodiment, the valve seat plate consists of a first plate member and a second plate member to meet the property requirements of the plate. For example, the second plate member is composed of a press product and the first plate member is composed of a lathe product which has a thickness greater than that of the second plate member. Thus, the first plate member composed of a lathe product is used to form the area of the surface of the valve seat plate in which the outlet openings are formed and on which the valve element rotates. Therefore, this area can be formed with high surface precision. Since the first plate member is a lathe product, it is thick enough to endure the temperature of brazing. Even when the outlet pipe is brazed into the first plate member, brazing does not cause warping on the surface on which the valve element rotates. Although a lathe product is relatively high in the process cost, the present invention in the embodiment shown uses a lathe product only for the first plate member. Therefore, only a limited surface area needs to be lathed. For this reason, the manufacturing costs can be kept to a minimum. As for the second plate member, an inexpensive press product is used. Although high surface precision cannot be obtained with a press product, it is not necessary for the second plate member since the valve element does not rotate on it. In other words, according to the present invention, a thick lathe product is used only for a minimal portion of the valve seat plate; therefore, pipes can be fixed without warping the surface portion on which the valve element rotates, and the manufacturing costs of the valve seat plate can be reduced.

In the present invention, it is preferable that the first plate member be large enough to form the entire area on which the valve element rotates to open and close the outlet opening.

In the present invention, it is preferable that the second plate member have a through hole which is used for attaching the first plate member, and that the first plate member have a small diameter portion which is inserted into the through hole, an annular step portion which comes into contact with the opening edge of the through hole when the small diameter portion is inserted into the through hole, and a large diameter portion which is to be outside the through hole. With this configuration, when the pipes are brazed from the side of the large diameter portion, the brazing material spreads in the gap between the first plate member and the second plate member. Thus, the members are joined together in a highly airtight manner.

In this present invention, it is preferable that the first plate member have a large diameter portion on the back surface side of the valve seat plate, and the first plate member and the second plate member be joined together by brazing from the back surface side. This configuration can prevent the surface precision of the valve seat plate, on which the valve element rotates, from being degraded due to the brazing material.

In the present invention, it is preferable that the thickness of the first plate member be 2.1 mm or more, and more suitably 2.4 mm or more. When the outlet pipes are first inserted into the pipe-inserting holes in the first plate member and then brazed to the first plate member, stress is applied to the first plate member during press-fitting and heat stress during brazing. However, by forming the first plate member with a thickness of 2.1 mm or more, change in the planarity of the first plate member, which may caused during press-fitting and brazing, can be limited to 1.0 μm or less. By forming the first plate member with a thickness of 2.4 mm or more, change in the planarity can be completely prevented. Therefore, the valve element moves on the surface of the first plate member with excellent planarity, and consequently the outlet openings are tightly closed.

An embodiment of a refrigerant distribution device of a refrigerator to which the present invention is applied, is described hereinafter referring to the drawings.

BRIEF DESCRIPTION OF THE DRAWINGS

FIGS. 3(A) through (F) are diagrams of the modes of the refrigerant distribution device of FIG. 1.

DETAILED DESCRIPTION OF THE INVENTION

Figure 1:
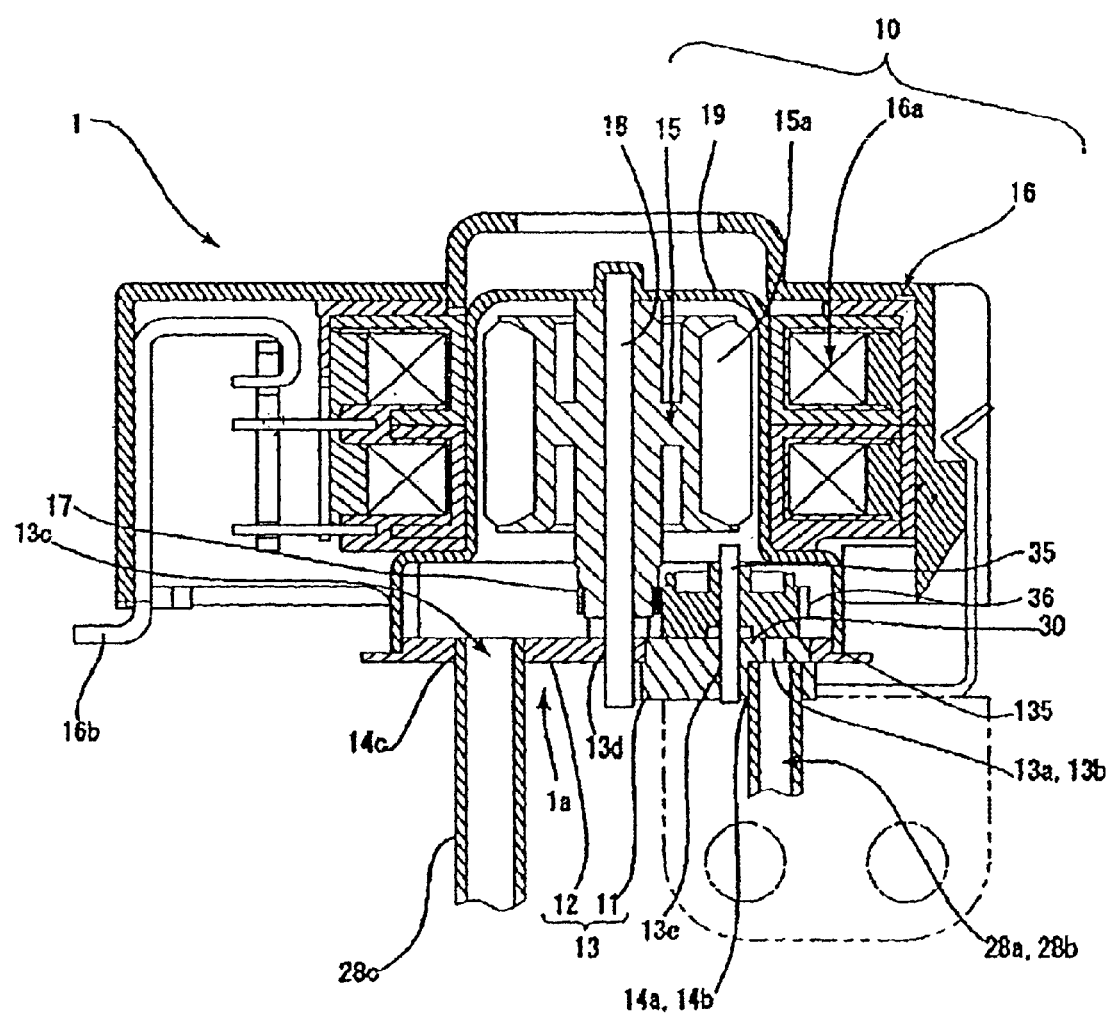
FIG. 1 is a vertical cross-sectional view of a refrigerant distribution device in a refrigerator to which the present invention is applied.
Figure 2A:
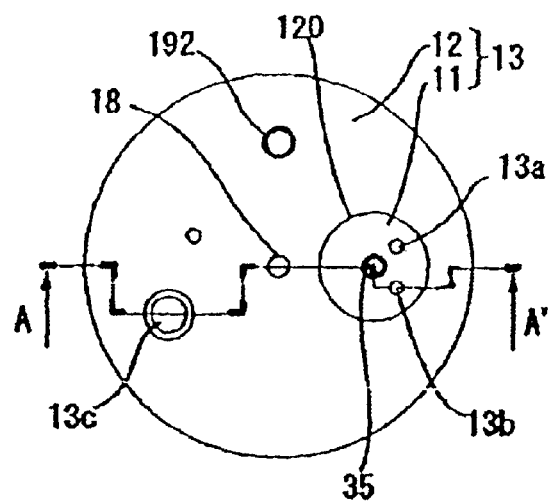
FIGS. 2(A), (B) and (C) are respectively a plan view, a vertical cross-sectional view, and a bottom view of a valve seat plate of a valve device which is used for the refrigerant distribution device of FIG. 1.
Figure 2B:
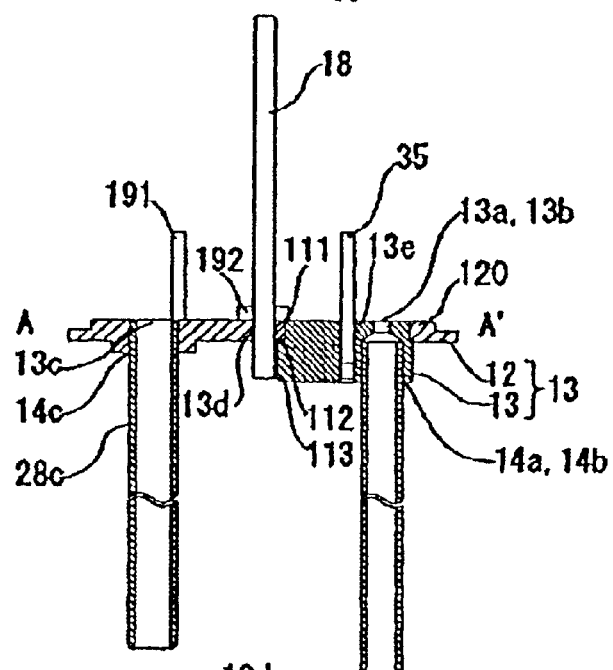

FIG. 1 is a vertical cross-sectional view of a refrigerant distribution device of a refrigerator, to which the present invention is applied. FIGS. 2(A), (B), and (C) are respectively a plan view, a vertical cross-sectional view, and a bottom view of a valve seat plate of a valve device which is used in the refrigerant distribution device illustrated in FIG. 1. FIG. 2(B) is a cross-section of the valve seat plate along the A–A' line of FIGS. 2(A) and (C). FIGS. 3(A) through (F) are respectively diagrams for the modes of the refrigerant distribution device illustrated in FIG. 1.

In FIG. 1, a refrigerant distribution device 1 of this embodiment has a valve device 1a equipped with a valve seat plate 13 and a sealing case 19 which covers the front side of the valve seat plate.

In the valve device 1a, a stepping motor 10 is configured inside and outside of the sealing case 19 as a valve drive device to drive a valve element. In the stepping motor 10, a rotor 15 is positioned inside the sealing case 19 and a stator 16 is positioned around the outer circumference of the sealing case 19. A conductor 16b is pulled out from a fixed coil 16a of the stator 16; a drive signal is sent from a controller (not illustrated) which is composed of a micro-computer to the conductor 16b to rotate and stop the rotor 15.

The rotor 15 has a magnet 15a integral with the outer circumference thereof and also has a pinion 17 formed at the end portion thereof on the side of the valve seat plate 13. The pinion 17 is rotatably supported with respect to a rotor support shaft 18 (center axis for rotation).

The bottom end of the sealing case 19 is widened to form a step on which the stator 16 is mounted, and is tightly fitted to a step 135 which is formed around the outer circumferential edge of the valve seat plate 13.

Figure 2C:
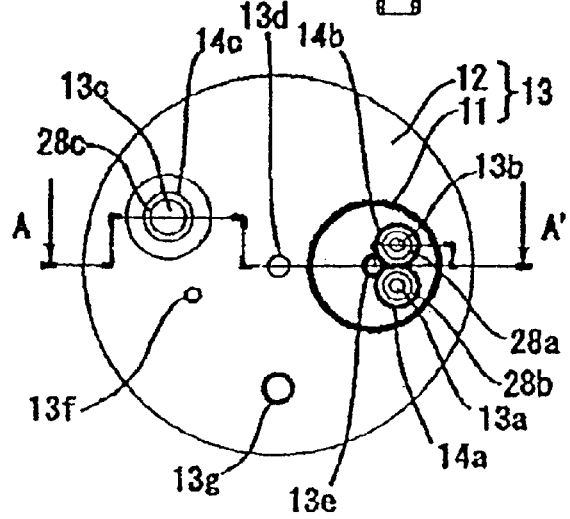

As illustrated in FIGS. 1 and 2 (A), (B), and (C), in the valve device 1a, the valve seat plate 13 has a front surface side and a back surface side. A fluid inlet 13c opens to the front surface, which is on the same side as the sealing case 19. A first fluid outlet 13a and a second fluid outlet 13b open to the area in the front surface of the valve seat plate 13, opposite the fluid inlet 13c with respect to the pinion 17.

The opposite side (the back surface side) of the valve seat plate 13 from the fluid outlet openings 13a and 13b and the fluid inlet opening 13c provides holes 14a, 14b and 14c for inserting pipes. The pipe-inserting holes 14a and 14b are formed with a diameter larger than those of the fluid outlet openings 13a and 13b. While each of the pipe-inserting holes 14a and 14b is formed with a step, the pipe-inserting hole 14c is a straight hole.

To the pipe-inserting hole 14c having such a configuration, a fluid inlet pipe 28c, through which a refrigerant is supplied, is inserted from the back and brazed so that the inlet pipe 28c and the inlet opening 13c are connected to each other. Also, to the pipe-inserting holes 14a and 14b, the first outlet pipe 28a and the second outlet pipe 28b, which send refrigerant to each compartment of the refrigerator, are inserted from the back and brazed so that the first outlet pipe 28a and the second outlet pipe 28b are connected respectively with the first outlet opening 13a and the second outlet opening 13b.

In the valve seat plate 13, shaft holes 13d and 13e are formed as straight holes in the vicinity of the outlet openings 13a and 13b. The base end of the rotor support shaft 18 and the base end of the valve element support shaft 35 are respectively brazed to the shaft holes 13d and 13e.

Also, a shaft hole 13f is formed as a straight hole in the valve seat plate 13. The base end of a positioning shaft 191 is brazed to the shaft hole 13f. Further, a bag hole 13g is formed in the valve seat plate 13 for positioning a jig, and a protrusion 192 is created on the opposite side from the bag hole 13g when the bag hole 13g is formed by pressing.

The brazing material, which is used for the brazing processes, provides airtightness to the shaft holes 13d, 13e and 13f.

Referring back to FIG. 1, the valve element 30 is formed integral with a gear 36 at the valve element support shaft 35. In this embodiment, the valve element 30 rotates over the area of the first outlet opening 13a and the second outlet opening 13b in the front surface of the valve seat plate 36 to open and close both first and second outlet openings 13a and 13b.

The gear 36 is meshed with the pinion 17 and driven by the stepping motor 10 to rotate about the valve element support shaft 35. Accordingly, the valve element 10 is also rotated by the stepping motor 10.

The close-close mode is where both the first and second outlet openings 13a and 13b are closed; the close-open mode is where the first outlet opening 13a is closed and the second outlet opening 13b is open; the open-open mode is where both the first and second outlet openings 13a and 13b are open; and the open-close mode is where the first outlet opening 13a is open and the second outlet opening 13b is closed. By changing the angular position of the valve element 30 (the area indicated by oblique lines in FIG. 3), the four modes of the outlet openings can be switched in the following order: the original position in close-close as illustrated in FIG. 3(A) (0th step); the close-close mode as illustrated in FIG. 3(B) (34th step); the close-open mode as illustrated in FIG. 3(C) (100th step); the open-open mode as illustrated in FIG. 3(D) (154th step); the open-close mode as illustrated in FIG. 3(E) (195th step); and the final position in open-close as illustrated in FIG. 3(F) (200th step).

Figure 4:
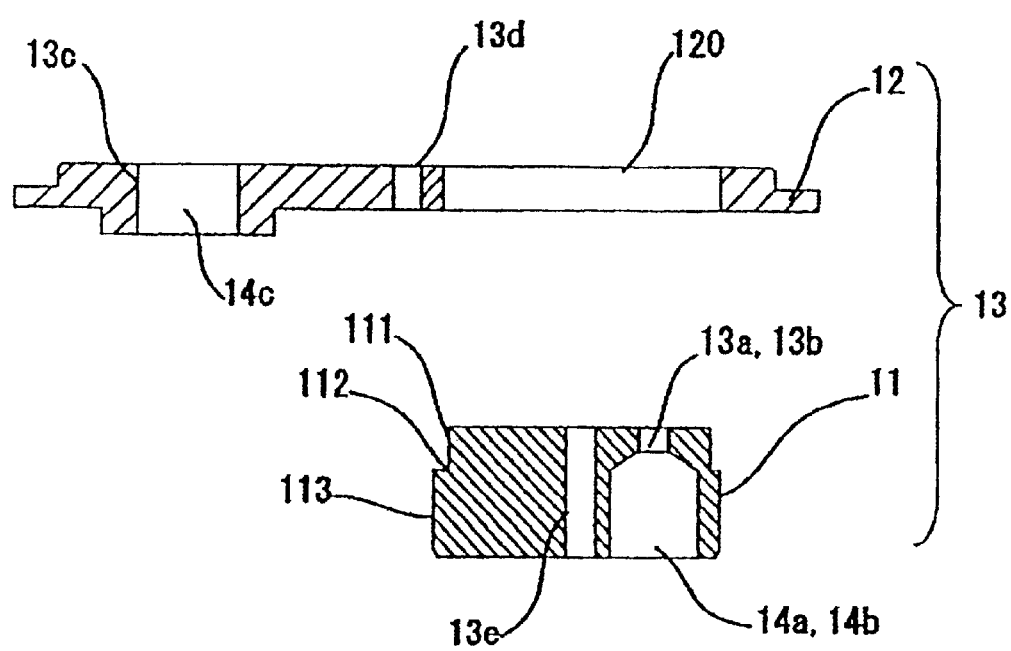
FIG. 4 is a vertical cross-sectional view of the disassembly of the valve seat plate of FIG. 2.

FIG. 4 is a vertical cross-sectional view of the disassembly of the valve seat plate as illustrated in FIG. 2.

As illustrated in FIGS. 1, 2(A), 2(B), 2(C) and 4, in the valve device 1a of this embodiment, the valve plate 13 consists of a first annular plate member 11, in which the outlet openings 13a and 13b are formed, and a second annular plate member 12, to which the first plate member 11 is joined. The first plate member 11 is large enough to form the entire area on which the valve element 30 rotates to open and close the outlet openings 13a and 13b.

In this embodiment, the second plate member 12 is composed of a press product and the first plate member 11 is composed of an SUS lathe product which has a thickness greater than that of the second plate member 12, for example, a thickness of 4 mm.

In the second plate member 12, a through hole 120 is formed to attach the first plate member 11.

In the first plate member 11, a small diameter portion 111, an annular step portion 112 and a large diameter portion 113 are formed. The small diameter portion 111 is inserted into the through hole 120 from the back surface side. When the small diameter portion 111 is inserted into the through hole 120, the annular step portion 112 comes into contact with the opening edge of the through hole 111. The large diameter portion 113 is positioned outside the through hole 120.

With this configuration, the small diameter portion 111 is press-fitted into the through hole 120 from the back so that the large diameter portion 113 is positioned on the back surface side and temporarily fixed as the annular step portion 112 comes into contact with the opening edge of the through hole 120. Then, the gap between the large diameter portion 113 and the second plate member 11 is brazed, and the brazing material spreads well in the gap between the first and second plate members 11 and 12. Thus, an excellent air-tightness can be obtained in the gap. Since brazing is performed from the back surface of the valve seat plate 13, the surface precision of the front surface of the valve seat plate 13 is protected from degradation, which normally is affected by brazing.

The inlet pipe 28c and outlet pipes 28a and 28b are connected to the valve seat plate 13, which is configured as above, in the following manner. The inlet pipe 28c is inserted from the back surface into the pipe-inserting hole 14c that is connected to the inlet opening 13c, and the outlet pipes 28a and 28b are inserted from the back surface into the pipe-inserting holes 14a and 14b that are connected to the outlet openings 13a and 13b; then, each joint is brazed from the back surface side.

As mentioned, the valve seat plate 13 consists of the first plate member 11 and the second plate member 12. The second plate member 12 is composed of a press product; the first plate member 11 is composed of a lathe product with a thickness greater than that of the second plate member 12. The area of the outlet openings 13a and 13b in the front surface of the valve seat plate 13 is the surface on which the valve element 30 rotates. Since the first plate member 11 composed of a lathe product is used to form this area, surface precision is high. Also, since the first plate member 11 is thick, even when the outlet pipes 28a and 28b are press-fitted into the holes and brazed, the press-fitting stress or heat stress does not warp the surface on which the valve element 30 rotates.

As described in this embodiment, although a lathe product is costly, the first plate member 11 composed of a lathe product is used only for the area which requires high surface precision with no warping. Therefore, high quality is obtained for the valve seat plate 13. Also, since the first plate member 11 composed of a lathe product is used only for the limited area requiring high-quality, it can be polished efficiently. Further, since a lathe product is used for the first plate member 11 which has a smaller outer diameter, only a shorter lathe processing time is required. Consequently the manufacturing cost can be kept to a minimum.

Additionally, an inexpensive press product is used for the second plate member 12. Although high surface precision may not be obtained and the heat from brazing may warp the surface, the area that is brazed is not the surface on which the valve element 30 will rotate. Therefore, although an inexpensive press product is used, the quality of the valve seat plate 13 is not degraded.

In the present invention, a thick lathe product is used for only a minimal portion; thus, the pipes can be attached without warping the surface on which the valve element 30 rotates, and also the manufacturing cost of the valve seat plate 13 can be reduced.

Figure 5:
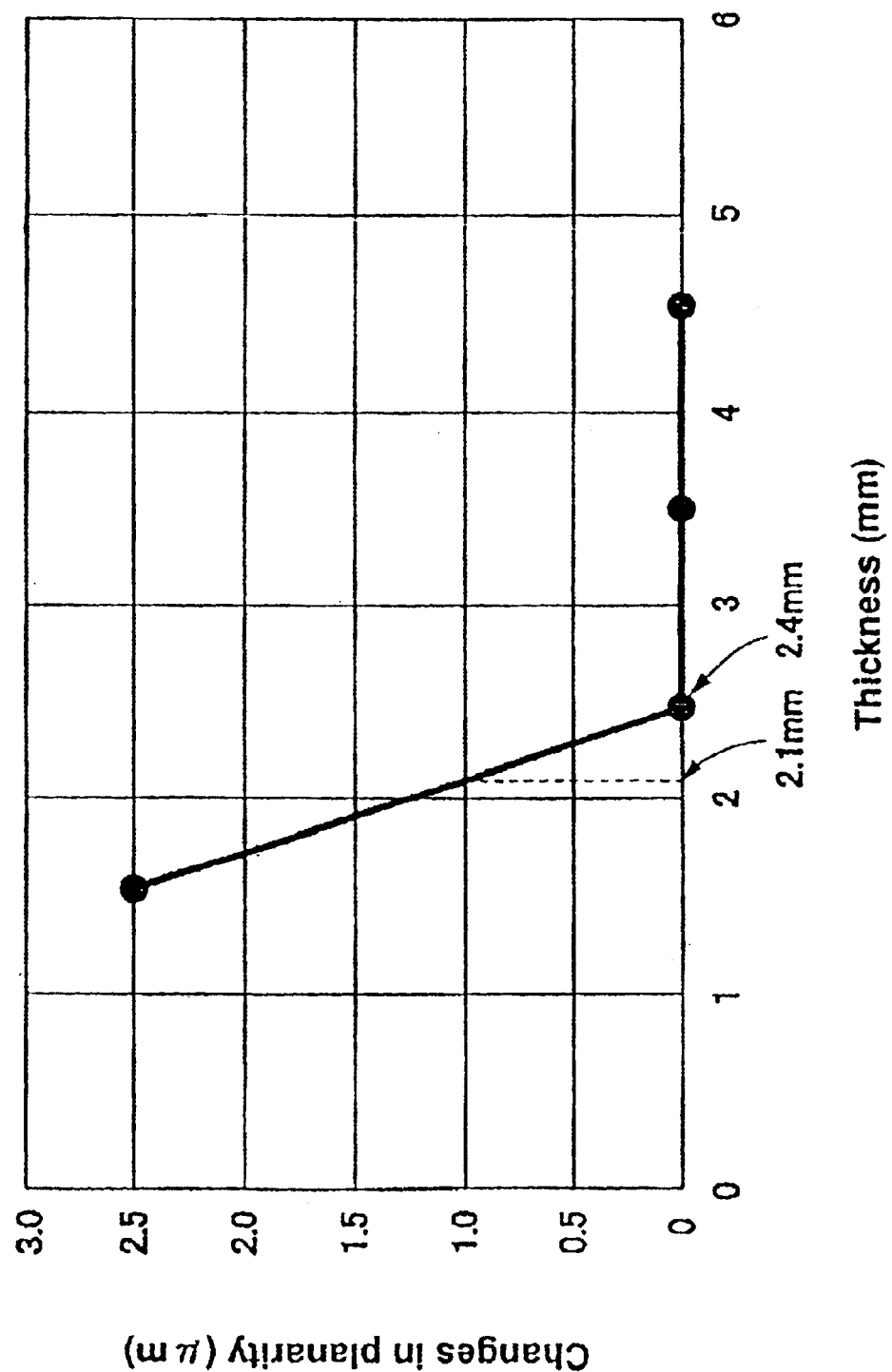
FIG. 5 is a graph showing the relationship between the thickness of the first plate member and the change of the planarity of the first plate member after press-fitting and brazing of the outlet pipes into the pipe-inserting holes in the refrigerant distribution device of FIG. 1.
Figure 6A:
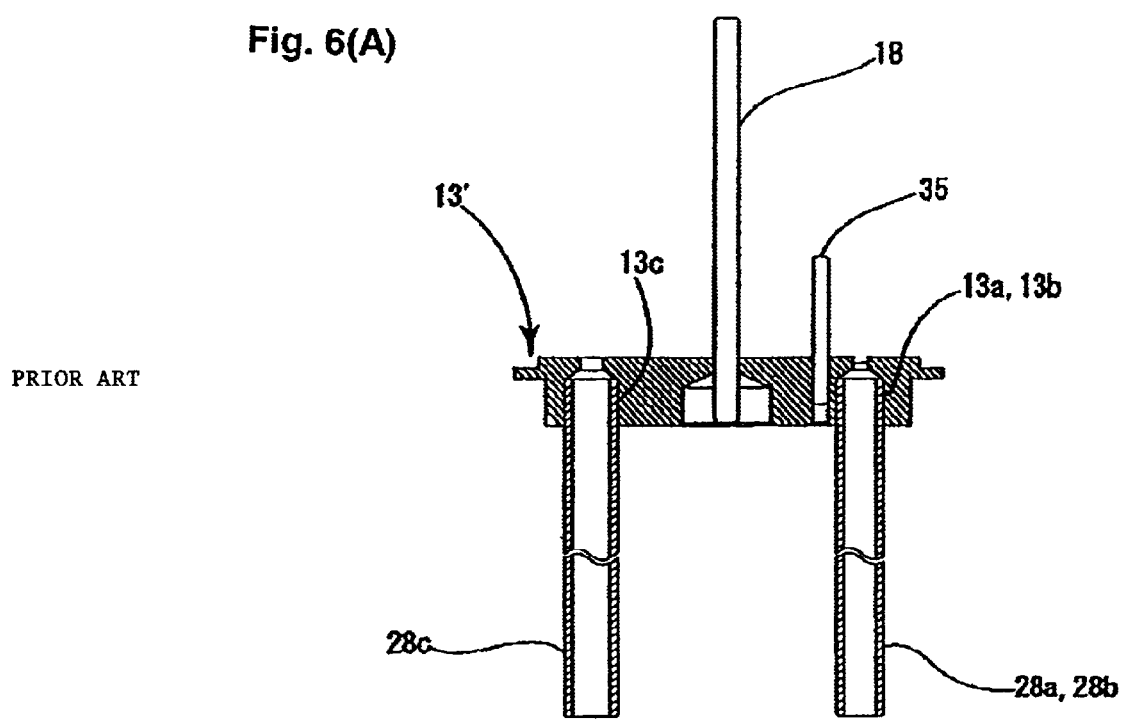
FIGS. 6(A) and (B) are respectively a vertical cross-sectional view and a bottom view of a valve seat plate of a conventional valve device.
Figure 6B:
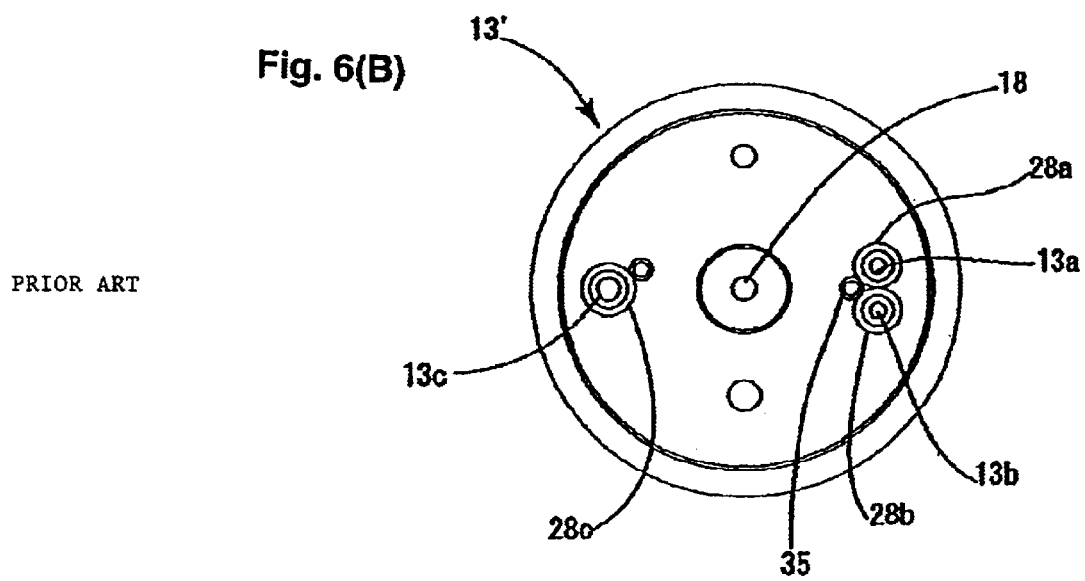

FIG. 5 is a graph that shows the changes in the planarity of the first plate ember 11 when the outlet pipes 28a and 28b are inserted into and then brazed to the pipe-inserting holes 14a and 14b of the first plate member 11.

When the outlet pipes 28a and 28b are first press-fitted into and then brazed to the pipe-inserting holes 14a and 14b in the first plate member 11, the change in the planarity of the first plate member 11 after press-fitting and brazing depends on the thickness of the first plate member 11, as illustrated in FIG. 5.

The front surface of the first plate member 11, that is, the surface on which the valve element 30 rotates, is polished in advance to increase planarity. The first plate member 11 needs to be given a thickness that can maintain the planarity thereof even after the outlet pipes 28a and 28b are press-fitted into the pipe-inserting holes 14a and 14b and brazed.

In this embodiment, the thickness of the first member 11 is determined in the following manner, based on the result shown in FIG. 5: when the amount of the change in the planarity must be limited to 1.0 $\mu$m or less, the first plate member 11 is given a thickness of 2.1 mm or more; when the planarity must be completely protected from degradation, the first plate member is given a thickness of 2.4 mm or more.

In the present invention, the valve seat plate consists of the first plate member and the second plate member, and a suitable material is used for each member according to the function of the member. Therefore, either a sintered product or a forged product can be used as the material for the first and the second plate member, depending on the type of valve device and valve seat plate that needs to be manufactured.

As described above, in the present invention, the valve seat plate consists of the first plate member and the second plate member. The second plate member is composed of a press product and the first plate member is composed of a lathe product which has a thickness greater than that of the second plate member. In this manner, the valve seat plate is configured to meet the required properties of each member. The area of the outlet opening in the front surface of the valve seat plate is also the surface on which the valve element rotates. Since the first plate member composed of a lathe product is used for this area, high surface precision can be obtained. The first plate member is composed of a lathe product; therefore, it can be formed with a thickness that can endure the temperature of the heat when the outlet pipe is brazed. Consequently the brazing does not warp the surface on which the valve element rotates. The manufacturing cost for a lathe product is high; however, since a lathe product is used only for the first plate member, which is a limited area, the increase in the manufacturing cost can be kept to a minimum. On the other hand, since the second plate member is not used for the area on which the valve element rotates, an inexpensive press product can be used for the second plate member, reducing the manufacturing cost of the valve seat plate.

What is claimed is:

1. A valve device comprising:
a valve seat plate having an inlet opening and an outlet opening through which a fluid flows in the thickness direction;
a sealing case which covers a front surface of said valve seat plate;
an inlet pipe and an outlet pipe which are fixed on a back surface of said valve seat plate to communicate respectively with said inlet opening and said outlet opening; and
a valve element which rotates on the area of said outlet opening on said front surface of said valve seat plate to open and close said outlet opening;
wherein said valve seat plate has a first plate member, which forms the area of said outlet opening, and a second plate member, to which said first plate member is joined.

2. The valve device as set forth in claim 1, wherein said second plate member is a press product and said first plate member is a lathe product which has a thickness greater than that of said second plate member.

3. The valve device as set forth in claim 1, wherein said first plate member is large enough to form the entire area on which said valve element rotates to open and close said outlet opening.

4. The valve device as set forth in claim 1, wherein said second plate member has a through hole which is used for attaching said first plate member; said first plate member has a small diameter portion which is inserted into said through hole, an annular step portion which comes into contact with an opening edge of said through hole when said small diameter portion is inserted into said through hole, and a large diameter portion which is to be outside said through hole.

5. The valve device as set forth in claim 4, wherein said first plate member has said large diameter portion on said back surface side of said valve seat plate, and said first plate member and said second plate member are joined together by brazing from said back surface side.

6. The valve device as set forth in one of claim 1, wherein the thickness of said first plate member is 2.1 mm or more.

7. The valve device as set forth in one of claim 1, wherein the thickness of said first plate member is 2.4 mm or more.

8. A valve device comprising:
a valve seat plate having an inlet opening, an outlet opening, a first side and a second side opposite to the first side;
a sealing case that covers the first side;
an inlet pipe and an outlet pipe which are attached to the second side to communicate respectively with the inlet and outlet openings; and
a valve element operable to cover the outlet opening on the first side to close the outlet opening;
the valve seat plate including a first plate, which forms the area around the outlet opening, and a second plate attached to the first plate and forming other areas.

9. The valve device as set forth in claim 8, wherein the second plate is a press product and the first plate is a lathe product that has a thickness greater than that of the second plate.

10. The valve device as set forth in claim 8, wherein the surface precision of the first plate is higher than that of the second plate.

11. The valve device as set forth in claim 8, wherein the valve element rotates on the area of the outlet opening and the first plate is sufficiently large to form the entire surface area on which the valve element rotates to open and close the outlet opening.

12. The valve device as set forth in claim 8, wherein the first and second plates are joined together by brazing from the second side.

13. The valve device as set forth in claim 1, wherein the thickness of the first plate is 2.1 mm or more.

14. The valve device as set forth in claim 1, wherein the thickness of the first plate is 2.4 mm or more.

* * * * *